United States Patent [19]

Huang

[11] Patent Number: 5,341,284
[45] Date of Patent: Aug. 23, 1994

[54] POWER-SAVING POWER SUPPLY UNIT

[75] Inventor: Ming-Ho Huang, Taipei, Taiwan

[73] Assignee: Hipro Electronics Co., Ltd., Taipei Hsien, Taiwan

[21] Appl. No.: 80,721

[22] Filed: Jun. 24, 1993

[51] Int. Cl.⁵ .............................................. H02M 5/42
[52] U.S. Cl. ....................................... 363/89; 323/282
[58] Field of Search ..................... 363/49, 89; 307/112, 307/116, 140; 323/282

[56] References Cited

U.S. PATENT DOCUMENTS

| | | | |
|---|---|---|---|
| 4,593,213 | 6/1986 | Vesce et al. | 307/564 |
| 4,903,188 | 2/1990 | Madhavan et al. | 363/96 |
| 5,091,837 | 2/1992 | Duspiva et al. | 363/21 |
| 5,237,492 | 8/1993 | King | 363/89 |

Primary Examiner—Steven L. Stephan
Assistant Examiner—Matthew Nguyen
Attorney, Agent, or Firm—Browdy and Neimark

[57] ABSTRACT

A power-saving power supply unit including a E.M.I. filter, a rectifier, a switching circuit, an output circuit, a kick circuit, a driver circuit, an auxiliary BAIX, and a control circuit, whereby the power supply unit gives no output as the control circuit is connected to 110 V AC power supply through a DC switch thereof; the output circuit provides a stable output power supply, as the DC switch of the control circuit is switched on.

4 Claims, 8 Drawing Sheets

POWER-SAVING POWER SUPPLY UNIT

BACKGROUND OF THE INVENTION

The present invention relates to power supply units, and more particularly the present invention relates to a power-saving power supply unit for a computer system which automatically shuts off as the computer system does no work after a certain length of time.

A computer system has a power supply unit to provide a stable working voltage. The power supply unit produces heat when gives a stable working voltage to the computer system. After a continuous long use, the electronic component parts of the mainframe of the computer system may be damaged by the heat of the power supply unit easily. Therefore, radiating fins, mini fans, and other heat dissipating devices are used for dissipating the heat of the power supply unit. These heat dissipating techniques can not completely dissipate the heat of the power supply unit out of the computer system. Further, the power supply unit is constantly electrically connected as the power switch of the computer system is switched on, and therefore much power supply is wasted as the computer system does no work. The service life of the electronic components will be shortened if continuously provides electricity to the electric circuit of the computer system as the computer system does no work.

SUMMARY OF THE INVENTION

The present invention has been accomplished under the aforesaid circumstances. It is therefore the principal object of the present invention to provide a power-saving power supply unit which saves power consumption. It is another object of the present invention to provide a power-saving power supply unit which prevents the electronic components of the electric circuit of the computer system from being aged quickly. It is still another object of the present invention to provide a power-saving power supply unit which ensures the long service life of the electronic components of the electric circuit of the computer system.

According to one aspect of the present invention, the power supply unit comprises a DC switch connected to the input end thereof. As output end of the power supply unit gives no power output as the input end of the power supply unit is connected to a 110 V AC power supply outlet. As the DC switch is switched on, the output end of the power supply provides a stable output voltage after a 50 ms to 100 ms time delay.

According to another aspect of the present invention, the DC switch is a MOSFET having a PNP transistor connected between the P pole and the G pole. The PNP transistor controls the opening and closing the MOSFET.

According to another aspect of the present invention, the DC switch is controlled by the computer system so that the power supply unit is automatically shut down as the computer system does no work.

DETAILED DESCRIPTION OF THE PREFERRED EMBODIMENT

Figure 1:
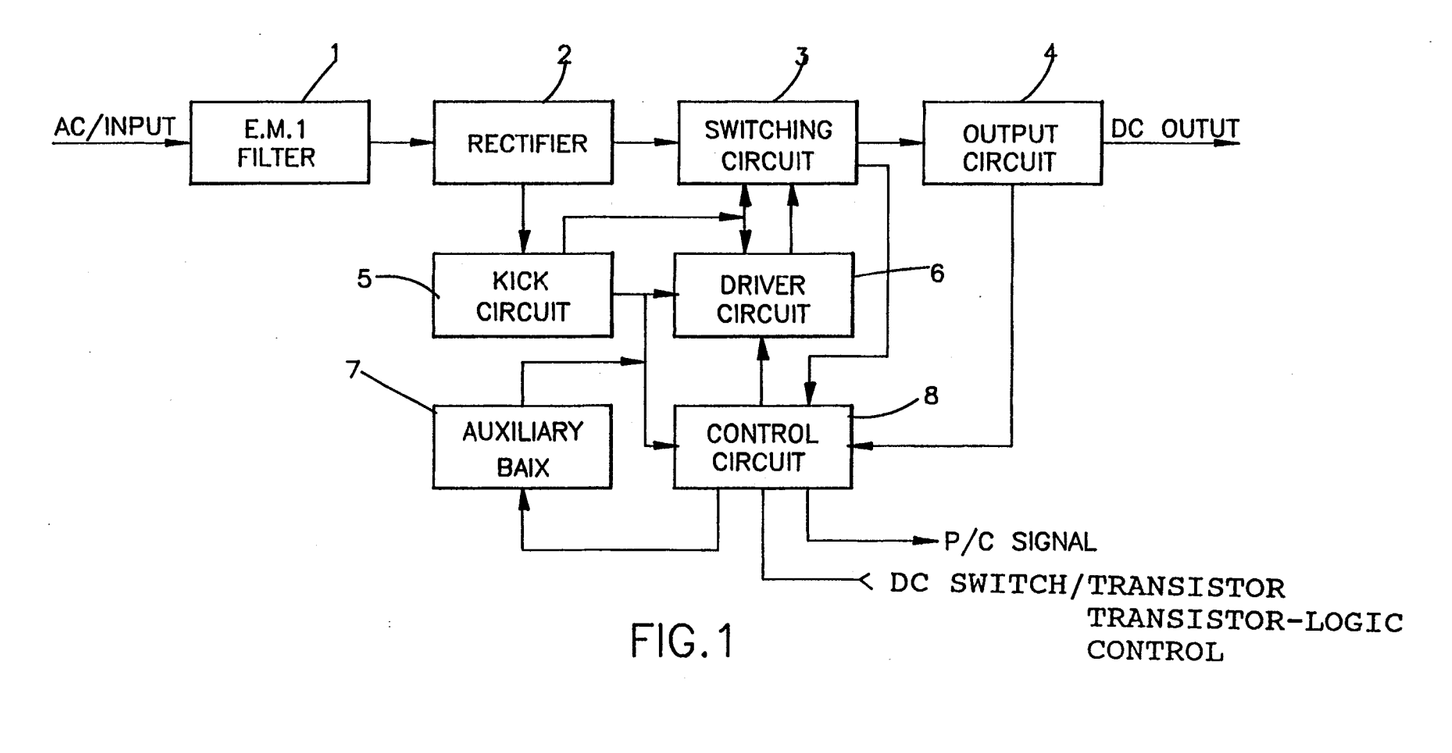
FIG. 1 is a circuit block diagram according to the present invention.
Figure 2:
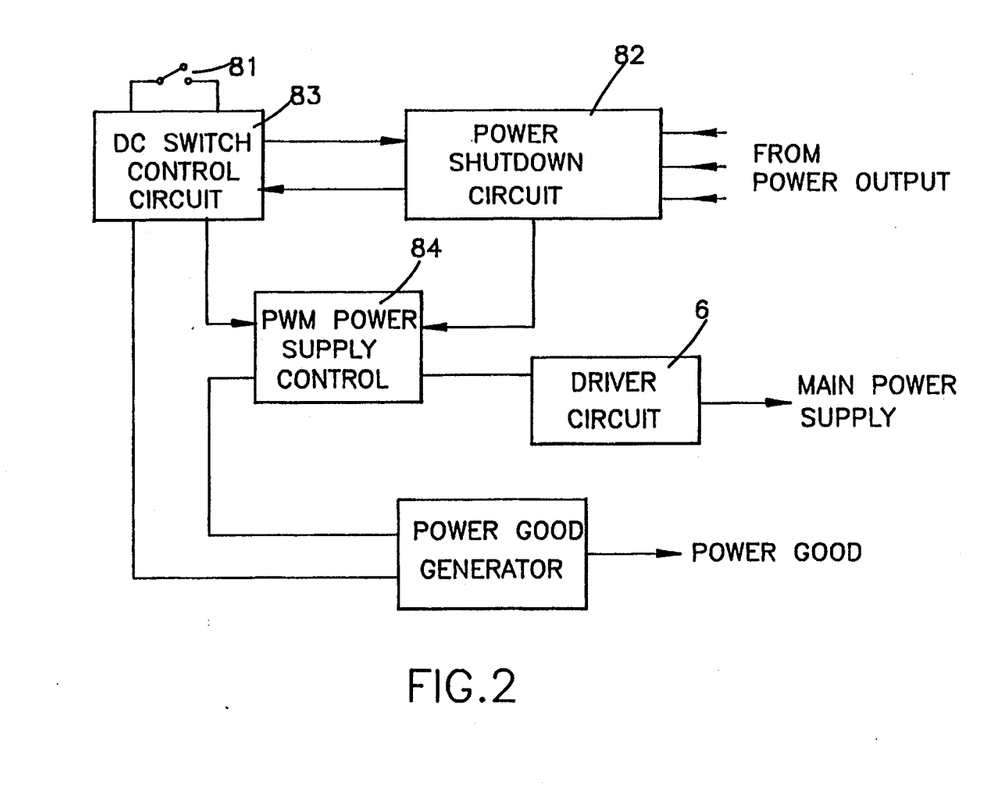
FIG. 2 is a partial block diagram of the control circuit for a power supply unit according to the present invention.

Referring to FIGS. 1 and 2, a power-saving power supply unit in accordance with the present invention is generally comprised of a E.M.I. filter 1, a rectifier 2, a switching circuit 3, an output circuit 4, a kick circuit 5, a driver circuit 6, an auxiliary BAIX 7, and a control circuit 8.

Figure 3:
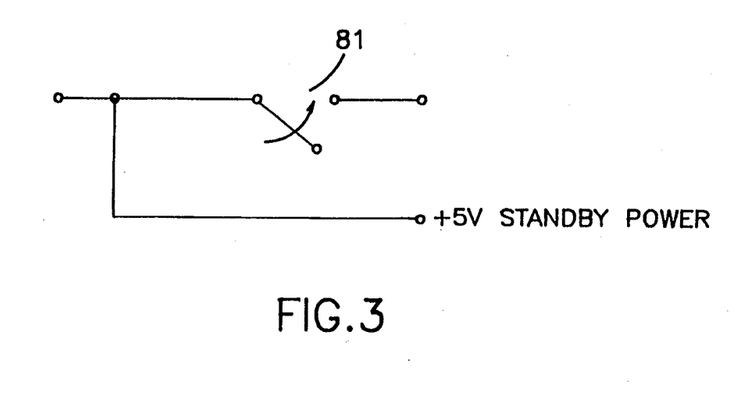
FIG. 3 illustrates the circuit layout of a DC switch according to the present invention.

When AC power supply 110 V is connected, the output circuit 4 gives no output. At this stage, the internal power signal of the power supply unit in the rectifier 2, switching circuit 3, output circuit 4, kick circuit 5, driver circuit 6, auxiliary BAIX 7 and control circuit 8 thereof is in a waiting mode (see the sine wave shown in FIG. 5). As the DC switch 81 of the control circuit 8 is switched on (see FIGS. 2 and 3), the output circuit 4 provides a 5 V standby power supply to a DC switch control circuit 83 via a power shutdown circuit 82, causing it to drive a PWM power supply control 84 so as to send a smaller power supply to the switching circuit 3 via the driver circuit 6, for driving the switching circuit 3 to send out a 5 V output power through the output circuit. As the DC switch 81 is switched off, the PWM power supply control 84 stops the driver circuit 6 from sending power output to the switching circuit 3, and therefore the output circuit 4 does no work.

Figure 5A:
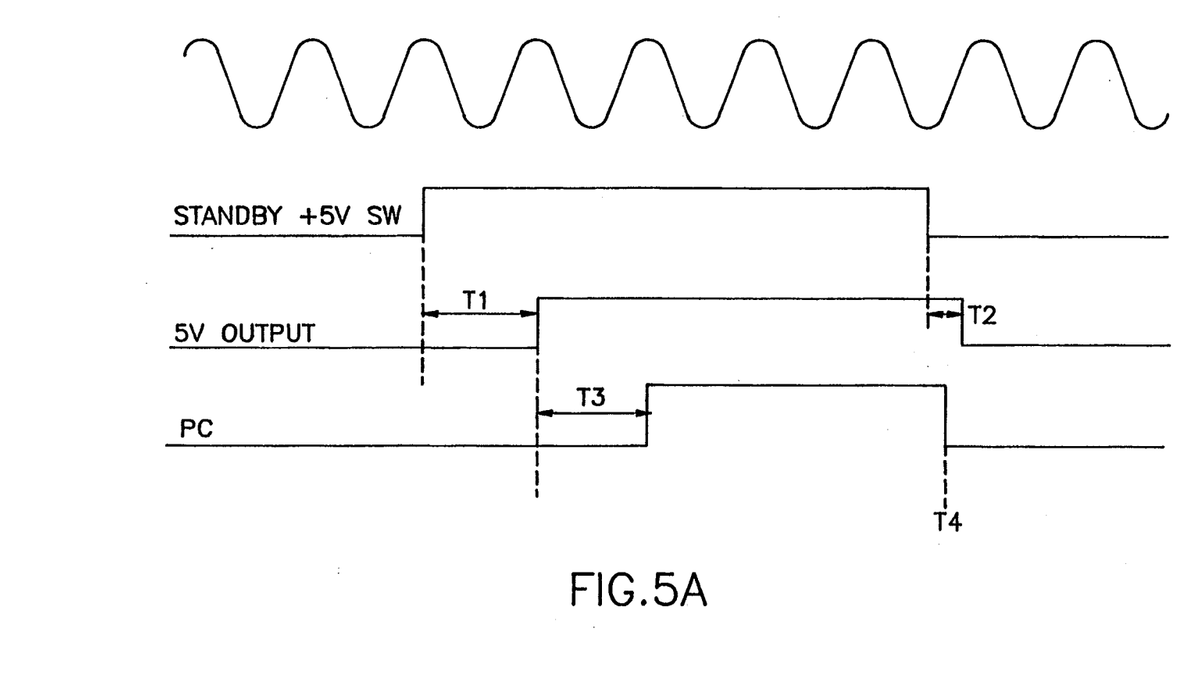
FIG. 5A is a signal time sequence diagram according to the present invention.

Referring to FIG. 5A, there is a 50 ms to 100 ms time difference between the output of the DC switch 81 and the output of the power supply unit as the DC switch 81 is ON (see T1 in FIG. 5A); a 3 ms to 5 ms time difference between the output of the DC switch 81 and the output of the power supply unit as the DC switch is OFF (see T2 in FIG. 5A); a 100 ms to 500 ms time difference between the output to the computer and the output of the DC switch 81 as the DC switch is ON (see T3 in FIG. 5A). However, when the DC switch is OFF, the power supply to the computer is OFF (see T4 in FIG. 5A).

Figure 4:
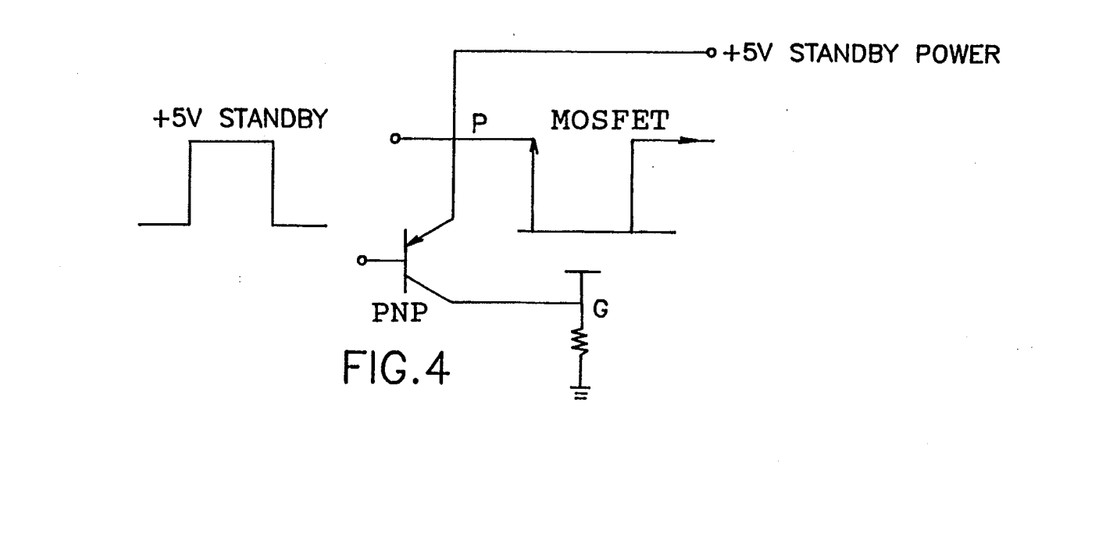
FIG. 4 illustrates the circuit layout of a MOSFET according to the present invention.

Referring to FIG. 4, a MOSFET 9 may be used to replace the aforesaid DC switch 81. The MOSFET 9 comprises a PNP transistor 91 connected between the P pole and the G pole. As the standby signal at the P pole is high, the PNP transistor 91 is ON, and the P pole and the G pole form into a short-circuit, therefore the MOSFET 9 is electrically disconnected and, the output circuit 4 gives no output. As the standby signal at the P pole is low, the PNP transistor 91 is OFF, and the P pole and the G pole form into an open circuit, therefore the MOSFET 9 is electrically connected and, the output circuit 4 gives an output.

Figure 5B:
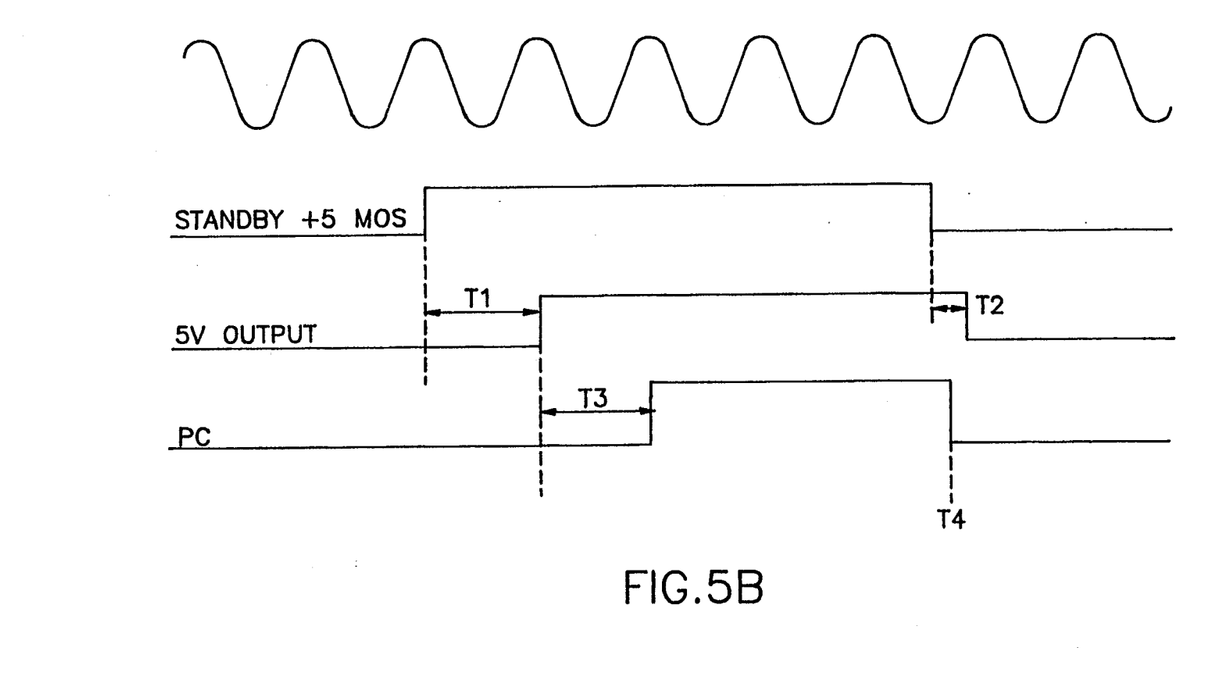
FIG. 5B is an another signal time sequence diagram according to the present invention.

Referring to FIG. 5B, there is a 50 ms to 100 ms time difference between the output of the MOSFET 9 and the output of the power supply unit as the MOSFET 9 is ON (see T1 in FIG. 5B); a 3 ms to 5 ms time difference between the output of the MOSFET 9 and the output of the power supply unit as the MOSFET 9 is OFF (see T2 in FIG. 5B); a 100 ms to 500 ms time difference between the output to the computer and the out of the MOSFET 9 as the MOSFET 9 is ON (see T3 in FIG. 5B). However, when the MOSFET 9 is OFF, the power supply to the computer is OFF (see T4 in FIG. 5B).

Figure 6:
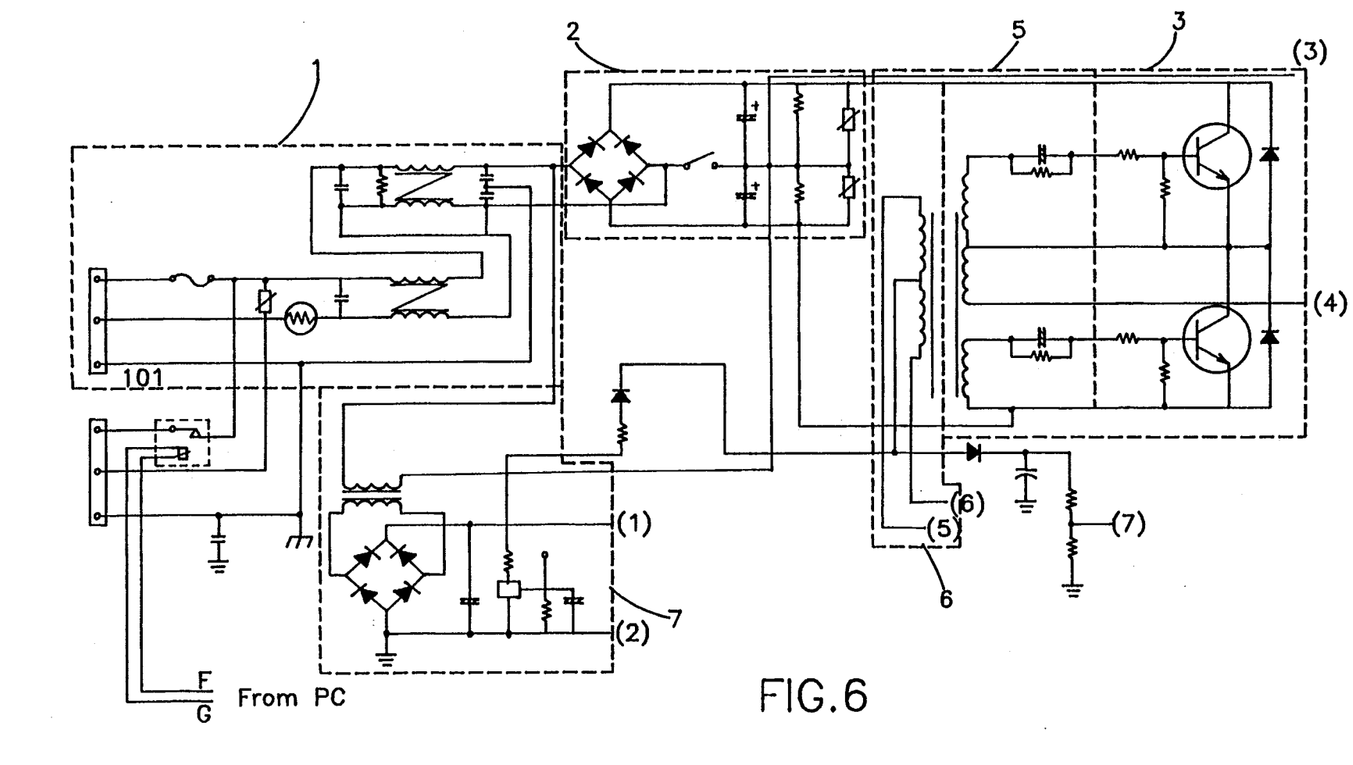
FIG. 6 is a circuit diagram (Part I) according to the present invention.

Referring to FIG. 6, the power supply unit can be controlled by the computer to shut off automatically. As the computer does no work after a predetermined length of time, the computer gives a signal through the input terminals F;G to drive a relay 101 so as to turn off the power supply unit.

Figure 7:
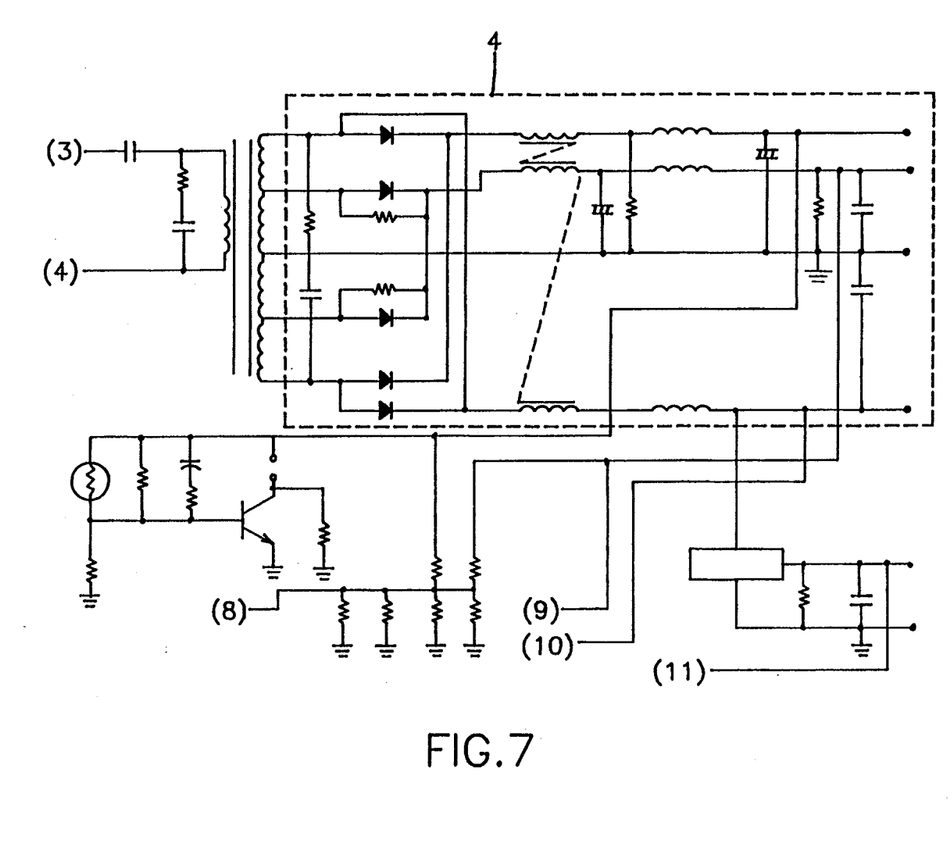
FIG. 7 is a circuit diagram (Part II) according to the present invention.
Figure 8:
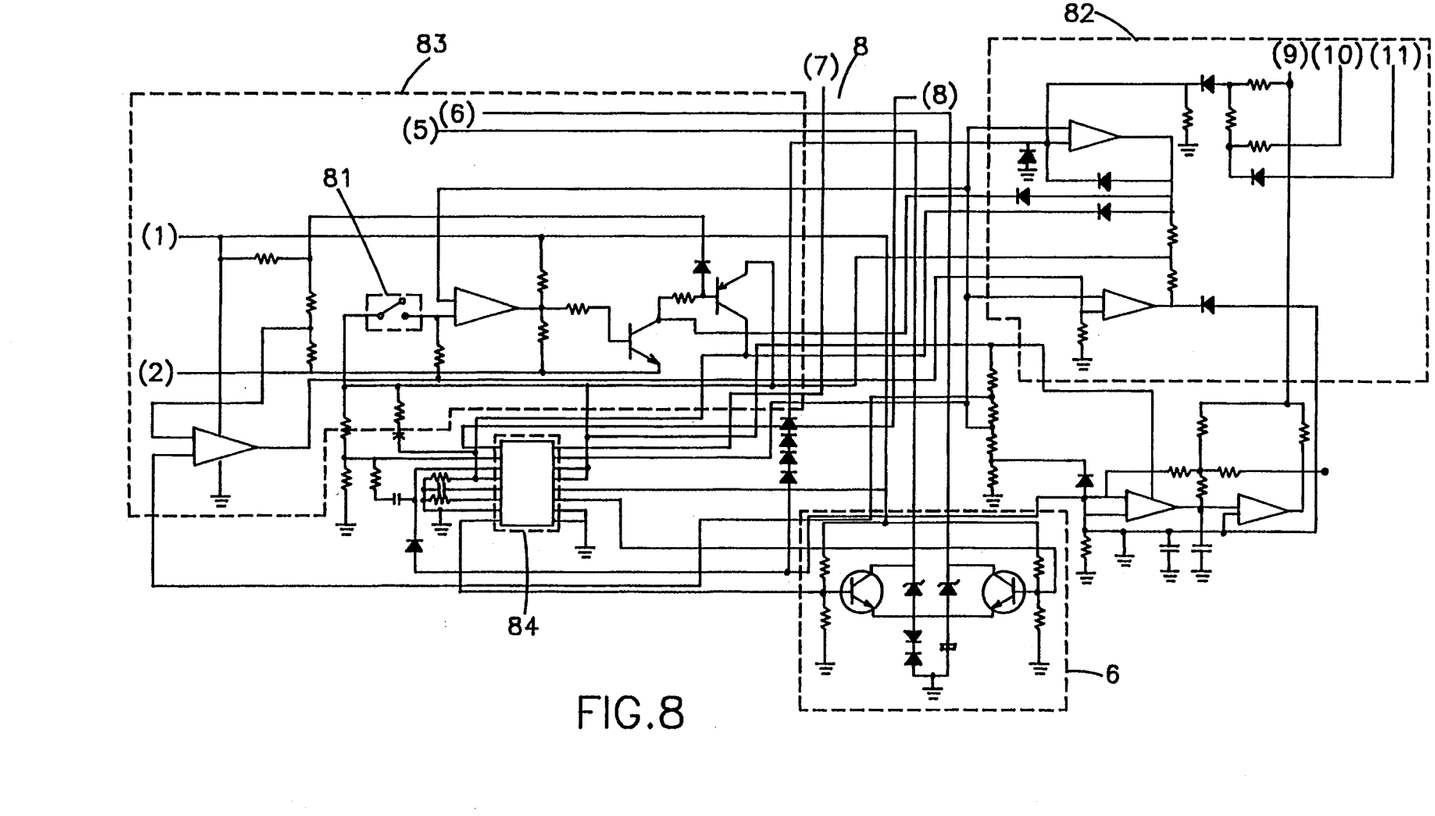
FIG. 8 is a circuit diagram (Part III) according to the present invention.

Again referring to FIG. 6, and to FIGS. 7 and 8, when AC power supply 110 v is connected, the output circuit 4 gives no output voltage, and at the same time the internal power signal at the rectifier is connected to the switching circuit 3 and the output circuit 4; kick circuit 5 is connected to the driver circuit 6, the auxiliary baix 7 and the control circuit 8, and therefore the power supply device is at the standby mode. When the DC switch 81 is switched on, the output circuit 4 provides a 5 V power supply to the DC switch control circuit 83 via the power shutdown circuit 82, causing the DC switch control circuit 83 to control the PWM power supply control 84, and therefore the driver circuit 6 is driven by the PWM power supply control 84 to provide a low voltage power supply to the switching circuit 3 causing the output circuit 4 to give a 5 V power supply output. When the DC switch 81 is switched off, the PWM power supply control 84 does no work, and the driver circuit 6 receives no signal from the PWM power supply control 84 and gives no power supply to the switching circuit 3, and therefore the output circuit 4 gives no output. The circuits shown in FIGS. 6, 7, and 8 are corresponding to the block diagram of FIG. 1, and therefore they are based on the same principle and provide the same functions. Numerals in parenthesis are line connection codes and are not to be confused with the numerals designating the boxes or the corresponding dashed boxes in FIGS. 6–8.

The functions of the circuits shown in FIGS. 6, 7, and 8 further explained are as follows. E.M.I. filter 1 is to protect the power supply from the interference of magnetic waves. Rectifier 2 is to rectify AC power supply into high voltage DC power supply. Switching circuit 3 is a power change transistor. The output circuit 4 is for the output of the power supply device, its output voltage, for example: 5 V, 12 V, etc., is subject to its original design. The kick circuit 5 is to provide a pulse signal to the driver circuit 6 causing it to turn on the switching circuit 3. The auxiliary baix 7 is to provide auxiliary power supply to the IC of the power supply device. With respect to the control circuit 8, when the DC switch control circuit 83 is closed, the comparator sends a signal to the PWM power supply control 84 via the transistor, causing the PWM power supply control 84 to provide a pulse to the driver circuit 6, and therefore the driver circuit 6 is triggered to convert the energy into DC output. The power shutdown circuit 82 is for circuit protection which automatically shuts off the PWM power supply control upon a short circuit, over- voltage, or overload, causing the power supply device stopped.

As stated above number in parenthesis are circuit conductor codes, including such as (10) and (11) in FIGS. 7 and 8.

What is claimed is:

1. A power supply unit comprising
    an E.M.I. filter to protect the power supply unit from interference of magnetic waves;
    a rectifier connected to said E.M.I. filter AC power into high voltage DC power;
    a switching circuit connected to said rectifier;
    an output circuit of the power supply unit connected to said switching circuit;
    a driver circuit connected to said switching circuit to turn on said switching circuit;
    a kick circuit connected to provide a pulse signal to said driver circuit to enable it to turn on said switching circuit;
    an auxiliary BAIX to provide an auxiliary power supply to an IC of the power supply unit having an output to said driver circuit;
    a control circuit having an output connection to said driver circuit;
    a DC switch with a DC switch control circuit connected to said control circuit with said DC switch in an open position shutting down power out of said output circuit;
    a power shutdown circuit connected to said DC switch control circuit;
    a pulse width modulation power supply control connected to said DC switch control circuit, said power shutdown circuit, and said driver circuit and providing a pulse to said driver circuit;
    a standby power supply provided by said output circuit to said DC switch control circuit via said power shutdown circuit as said DC switch is switched on, causing said DC switch control circuit to drive said pulse width modulation power supply control so as to send a smaller power supply to said switching circuit via said driver circuit, for driving said switching circuit to send a power output through said output circuit;
    said pulse width modulation power supply control stopping said driver circuit from sending said power output through said output circuit when said DC switch is switched off.

2. The power supply unit according to claim 1 wherein said DC switch is a MOSFET having a PNP transistor connected between the P pole and the G pole for On/Off control.

3. The power supply unit according to claim 2 wherein said PNP transistor is electrically connected as the standby signal of the P pole is at high potential, causing a short-circuit between the P pole and the G pole so that the MOSFET is electrically disconnected and, said output circuit of the power supply unit gives no output power.

4. The power supply unit according to claim 2 wherein said PNP transistor is electrically disconnected as the P pole is at low potential causing an open circuit between the P pole and the G pole so that the MOSFET is electrically connected and, said output circuit of the power supply unit gives an output power.

* * * * *